(12) United States Patent
Yamamoto et al.

(10) Patent No.: US 6,959,392 B1
(45) Date of Patent: Oct. 25, 2005

(54) INFORMATION PROVIDING SYSTEM AND METHOD FOR PROVIDING INFORMATION

(75) Inventors: Kenichi Yamamoto, Kawasaki (JP); Hideaki Okada, Maebashi (JP); Teruo Nakazawa, Maebashi (JP); Hideki Mikamoto, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/465,761

(22) Filed: Dec. 17, 1999

(30) Foreign Application Priority Data

Dec. 22, 1998 (JP) ................................. 10-365589

(51) Int. Cl.$^7$ ........................ G06F 11/30; G06F 12/14; H04L 9/00

(52) U.S. Cl. ...................................... 713/201; 713/200

(58) Field of Search ................................. 713/200, 201

(56) References Cited

U.S. PATENT DOCUMENTS 5,875,296 A * 2/1999 Shi et al. .................... 713/202
5,881,231 A * 3/1999 Takagi et al. ................ 709/212

FOREIGN PATENT DOCUMENTS

JP 10-301874 11/1998
WO WO 97/33415 9/1997

OTHER PUBLICATIONS

IBM Technical Disclosure Bulletin, Jan. 1, 1995, vol. 38 pp. 265-266.*
Japanese Office Action issued Nov. 24, 2004 (5 pages) in related Japanese Patent Application No. 10-365589.

* cited by examiner

Primary Examiner—Gilberto Barron, Jr.
Assistant Examiner—Grigory Gurshman
(74) Attorney, Agent, or Firm—Staas & Halsey LLP

(57) ABSTRACT

In an information providing system, a condition notifying part is provided by a providing part to the user terminal with information that is in accordance with a request of the user terminal, is activated in a user terminal connecting to the information providing system via a network and notifies of a condition of the user terminal. In addition, a session management part manages session information in accordance with the condition of the user terminal notified by the condition notifying part activated in the user terminal. A session between the information providing system and the user terminal is established when the user is authenticated in accordance with authentication information from the user terminal and the session information managed by said session management part.

20 Claims, 9 Drawing Sheets

INFORMATION PROVIDING SYSTEM AND METHOD FOR PROVIDING INFORMATION

BACKGROUND OF THE INVENTION

1. Field of the Invention

The present invention generally relates to information providing systems and methods for providing information that provide information via a network, and more particularly to an information providing system and a method for providing information that can provide information required by users while user information about the users accessing the provided information can be managed.

Recently, especially in the Internet industry using computers, the Internet has increased its business value yearly and information providing services are frequently performed for authorized users through the World Wide Web (hereinafter called WWW). In this case, authentication technologies are applied so as to confirm whether a user is authorized to use the information providing services. However, when a duplicate use of the same user ID from two different terminals is attempted to connect to the same server at the same time, the duplicate use of the user ID is authenticated. Also, when a user's terminal is not capable of communicating with a server after a user ID is authenticated, the user is not able to access the server from another terminal. Problems of the authentication technologies such as those mentioned above are occurring. Accordingly, current authentication technologies at servers are not enough to manage user access information. It is desired to provide a system in which a server can recognize connection conditions of authenticated users' client terminals (hereinafter referred to as clients).

2. Description of the Related Art

A conventional user authentication on the WWW will now be explained.

FIG. 1 is a schematic illustration of a WWW network structure.

In FIG. 1, the WWW network structure includes a server 200 to provide information, clients 2201 through 220n for users to access the server 200 (hereinafter a reference number 220 is used for a client as a general term) and a public network 210 such as the Internet.

In order to be provided information from the server 200, a user connects a client 220 to the server 200 via the public network 210. After the client 220 is connected to the server 200, the server 200 starts to provide information in accordance with user's requests.

A conventional method for managing user access information about a user that uses a client connecting to a server on the WWW will now be explained.

FIG. 2 is a flowchart showing an example of a conventional WWW user access management.

For example, in order to connect a client 2201 to a server 200, the user A accesses a screen 1 provided by the server 200 (step S1). The server 200 sends an authentication screen for authenticating the user A to the client 2201 (step S2). The user A inputs a user ID and a password to the authentication screen displayed at the client 2201 (step S3). The server 200 authenticates the user A based on the user ID and the password sent from the client 2201 (step S4) and registers the user ID with a session ID (for example, '123') assigned for the user ID to a management table (step S5). Also, the server 200 sets the session ID in the screen 1 and sends the screen 1 to the client 2201 (step S6). At the client 2201, the screen 1 sent from the server 200 is displayed (step S7). In accordance with a user's request, the client 2201 makes a screen 2 request of the server 200 after the client 2201 sends the session ID set in the screen 1 to access screen 2 next (step S8). The server 200 confirms the session ID ('123') in the management table based on the request from the client 2201 (step S9). In this case, the session ID ('123') is already registered for the user ID. Hence, the server 200 sends a screen 2 to the client 2201 (step S10). The screen 2 is received and displayed at the client 2201.

It is assumed that the user A or another user attempts to connect another client 2202 to the server 200 by using the user ID and the password for the user A.

The client 2202 accesses the screen 1 provided by the server 200 (step S12). The server 200 sends the authentication screen to the client 2202 (step S13). When the authentication screen is displayed at the client 2202, the user inputs the user ID and the password for the user A and the client 2202 sends this information to the server 200. The server 200 confirms the user ID and the password received from the client 2202 (step S15). That is, the server 200 checks whether a session ID for the user ID is registered in the management table or not. In this case, the session ID for the user ID is already registered as '123' and is still being used on the WWW. Hence, the server 200 sends an error message to the client 2202 (step S16). The error message is displayed at the client 2202 (step S17). The message shows the user that no information will be provided. And the access by the user A is denied.

In the conventional user access management on the WWW, the server 200 allows a duplicate login of the user A to obtain information service that is only for authenticated users while the user A is still being provided information from the server 200.

The Internet was originally constructed such that any user connecting to the Internet was allowed to share all information provided by servers connecting to the Internet. In this feature of the Internet, generally, the servers do not have to monitor a screen flow of clients or the like. Thus, some servers do not have a function such as a function for monitoring the screen flow.

In the conventional user access management on the WWW as shown in FIG. 2, it is assumed that the user A accesses another home page provided by another server and a browser of the client 2201 flows to another screen while the user A is provided information by the server 200 on the WWW. In this case, the server 200 does not have a function for monitoring the screen flow of the client 220. Thus, the session ID for the user A remains in the management table of the server 200. After that, the user ID and the password for the user A can not be allowed to access the server 200.

Also, even if the client 2201 used by the user A is not able to communicate with the server 200 because a fault occurs during the session established with the server 200, the server 200 does not have any means to recognize an abnormal state of the client 2201. As a result, the session between the server 200 and the client 2201 remains in the management table. Thus, the user ID and the password for the user A can not be used to access the server 200.

SUMMARY OF THE INVENTION

It is a general object of the present invention to provide information providing systems and methods for providing information that provide information via a network in which the above-mentioned problems are eliminated.

A more specific object of the present invention is to provide an information providing system and a method for providing information that can provide information required by users while user information about the users accessing the provided information can be managed.

The above objects of the present invention are achieved by an information providing system including: a condition notifying part, which is activated in a user terminal connecting to the information providing system via a network, for notifying of a condition of the user terminal; a providing part for providing the condition notifying part to the user terminal with information that is in accordance with a request of the user terminal; and a session management part managing session information to provide information to the user terminal in accordance with the condition of the user terminal that is notified by the condition notifying part activated in the user terminal, so that a session between the information providing system and the user terminal is established when the user is authenticated in accordance with authentication information from the user terminal and the session information managed by the session management part.

According to the present invention, the session management part manages the session, which is used to provide information to the user, in accordance with the condition of the user terminal that is notified by the condition notifying part activated in the user terminal. Therefore, it is possible to manage the session in accordance with the condition of the user terminal.

In addition, the above objects of the present invention are achieved by a method for providing information including the steps of (a) notifying of a condition of a user terminal, which notifying is activated in the user terminal connecting to a server via a network; (b) providing the step (a) from the server to the user terminal with information that is in accordance with a request of the user terminal; and (c) managing session information in the server to provide information to the user terminal in accordance with the condition of the user terminal notified by the step (a) activated in the user terminal, so that a session between the server and the user terminal is established when the user is authenticated by the server in accordance with authentication information from the user terminal and the session information managed in the step (c).

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
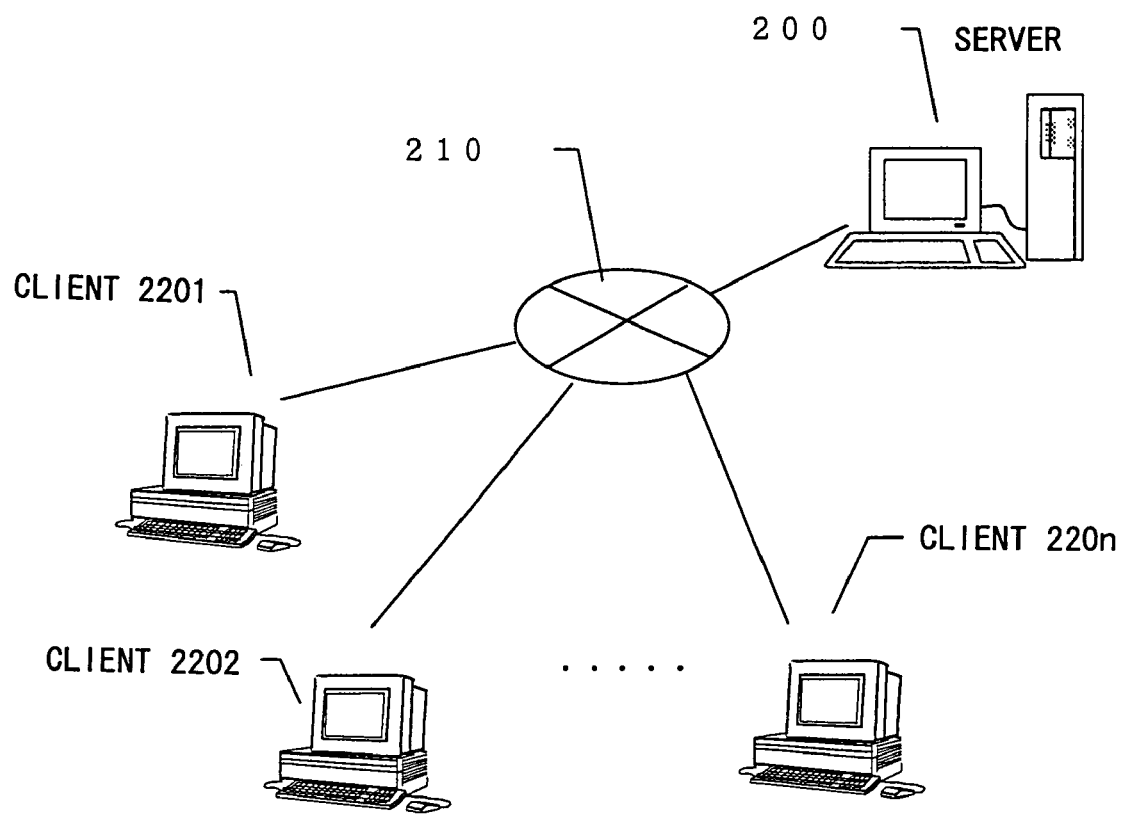
FIG. 1 is a schematic illustration of a WWW network structure.
Figure 2:
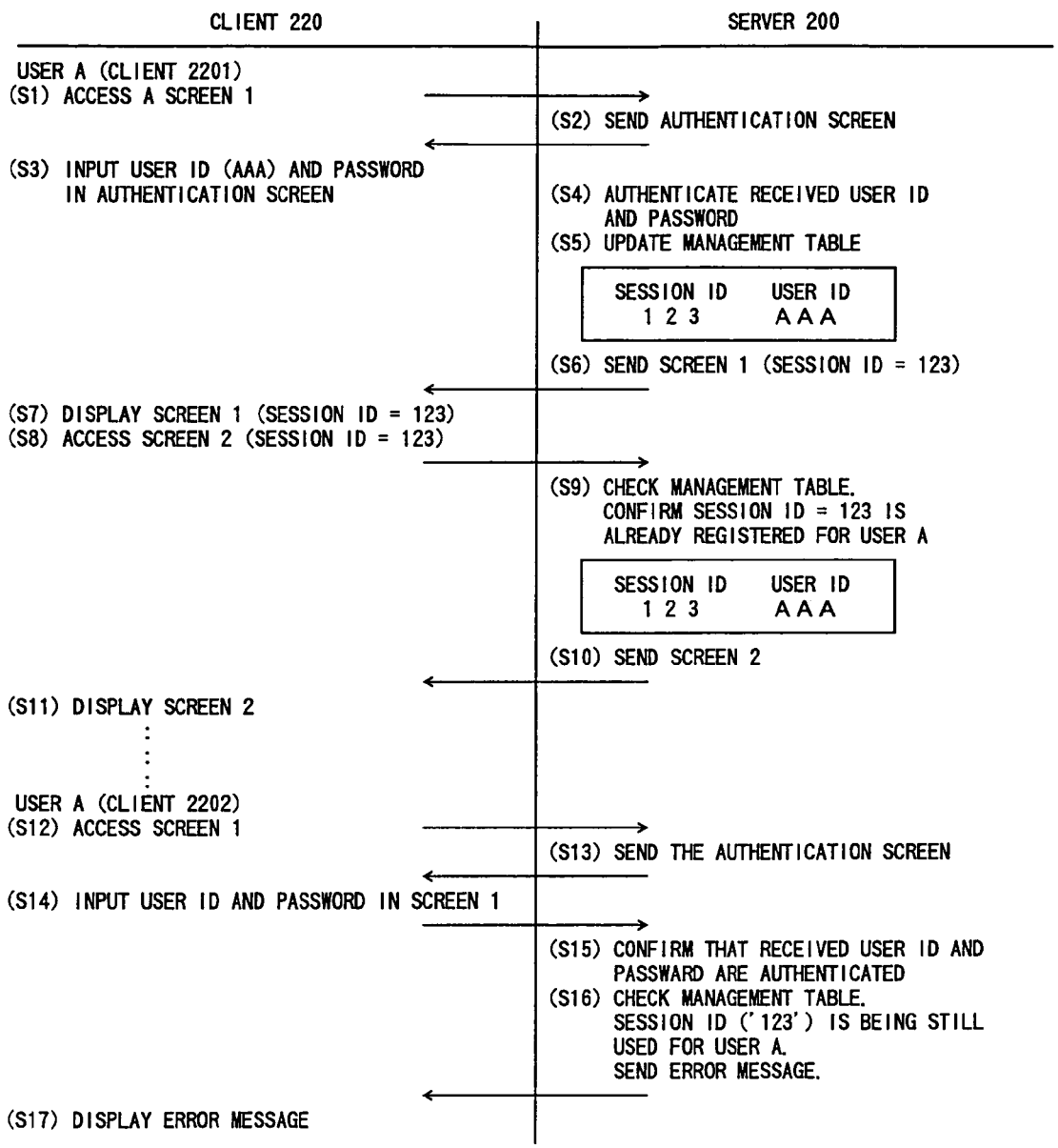
FIG. 2 is a flowchart showing an example of a conventional user access management on the WWW.
Figure 3:
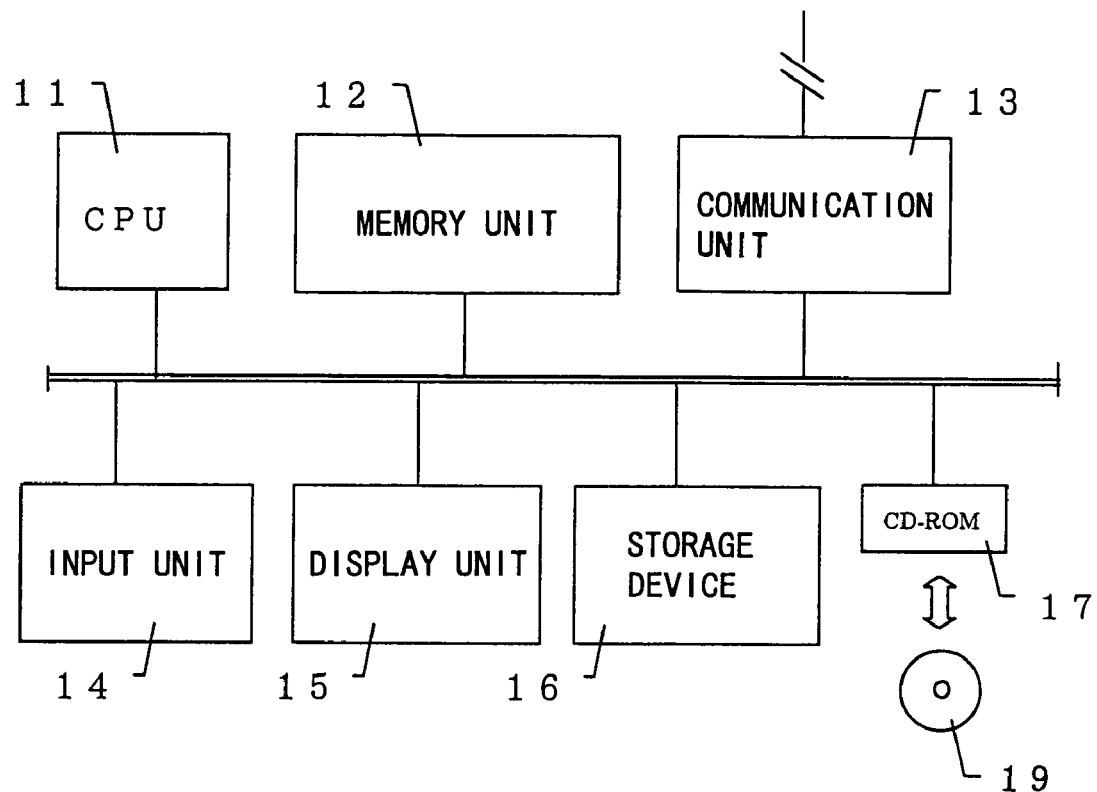
FIG. 3 is a hardware configuration of a server on the WWW as an information providing system according to an embodiment of the present invention.

FIG. 3 is a hardware configuration of a server on the WWW as an information providing system according to an embodiment of the present invention.

In FIG. 3, the server providing information on the WWW includes a CPU 11 to execute a session management program that will be explained later, a memory unit 12 to temporarily store the program and data, a communication unit 13 to control sending/receiving of data to/from outside, an input unit 14 to control input data, a display unit 15 to control display information, a storage device 16 to load the program to be executed and a CD-ROM drive unit 17 to access a CD-ROM 19, all of which are connected to a bus. Programs according to an information providing process are provided by the CD-ROM 19. That is, programs read from the CD-ROM 19 are installed into the storage device 16 through the CD-ROM drive unit 17. It should be noted that a recording medium is not limited to a CD-ROM, but other computer-readable recording media such as a magnetic disk, a magnetic tape, an optical disk, an optical magnetic disk, a semiconductor memory or the like may be used.

Also, hardware configurations of the clients 220 connecting to the server 200 are the same as that of the server 200.

Figure 4:
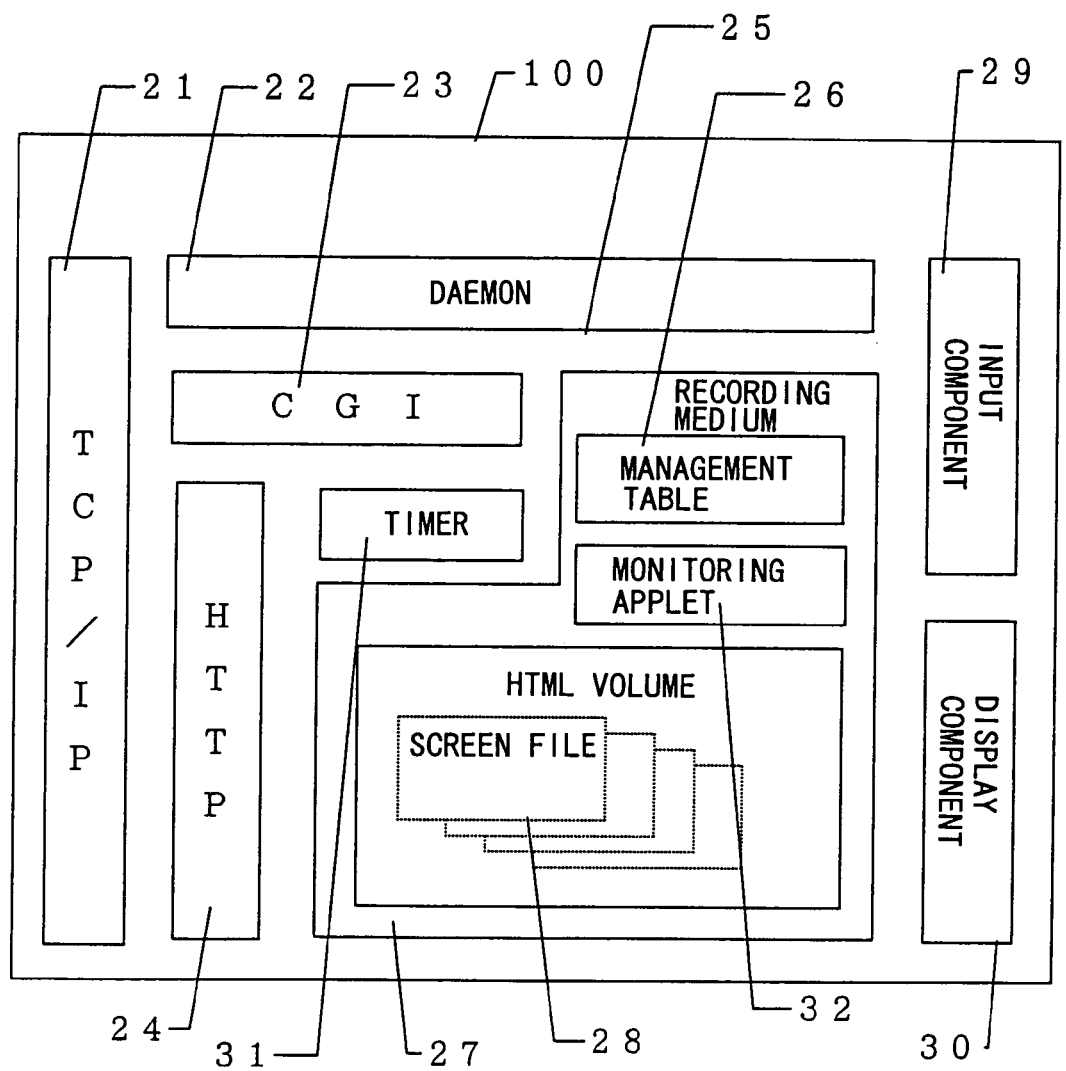
FIG. 4 is a block diagram showing a functional construction of a server 100.

FIG. 4 is a block diagram showing a functional construction of a server 100.

The server 100 as an information providing system includes a communication protocol TCP/IP (Transmission Control Protocol/Internet Protocol) 21 to control data from/to the communication unit 13 in FIG. 3, a daemon 22 to manage user information, a CGI (Common Gateway Interface) 23 to associate with external programs, an HTTP (HyperText Transfer Protocol) 24 to display a screen file on a browser, a recording medium 25 to store tables or files needed by the system, a management table 26 to authenticate users, an HTML (HyperText Mark-up Language) area 27, screen files 28 to be displayed on the browser, an input component 29 to control input data from the input unit 14, a display component 30 to control display information, a timer 31 to clock a predetermined time, and a monitoring applet 32 to be activated at a client 220.

The client 220 is able to communicate with the server 100 by processing a Socket ( ) command. After the Socket ( ) command is processed, the daemon 22 in the server 100 authenticates a user ID and a password sent from the client 220 in accordance with the management table 26. Thus, a session between the client 220 and the server 100 is established.

The screen 28 including the information to be provided to the user is transmitted to the client 220 on the HTTP 24 on the TCP/IP 21 and is displayed on a browser of the client 220 used by the user.

The monitoring applet 32 is transmitted to the client 220 by attaching to a first screen file 28 when the session is established. The monitoring applet 32 installed into the client 220 starts to monitor a screen state of the browser at the client 220 such as a screen flow and sends screen event information indicating the screen state to the server 100 at every screen flow. The monitoring applet 32 in the client 220 executes the CGI 23 in the server 100 if necessary so as to update the management table 26 via the CGI 23.

The timer 31 starts simultaneously when the session is established and is used to confirm at the predetermined time whether the user is still using the information provided by the server 100. The session is released when the access of the user on the session is recognized before the predetermined time.

According to the embodiment of the present invention, a session establishment between the server and a client on an upper layer of the TCP/IP and a monitor process of the client, will now be explained with reference to FIG. 5.

Figure 5:
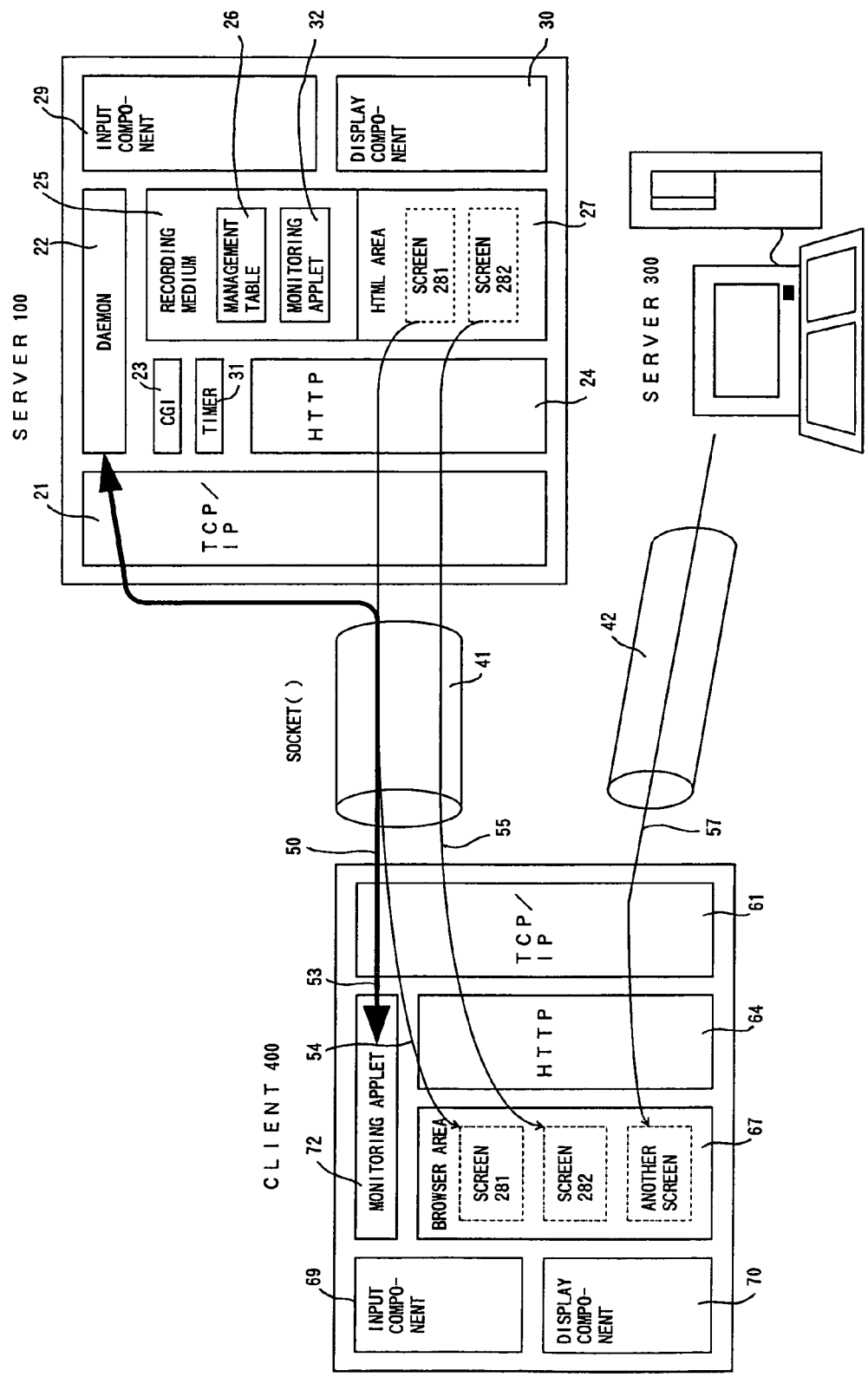
FIG. 5 is a diagram showing a session establishment between the server 100 and a client 400.

FIG. 5 is a diagram showing a session establishment between the server 100 and a client 400.

The functional construction of the server 100 as an information providing system is as shown in FIG. 4.

The client 400 includes a communication protocol TCP/IP 61, an HTTP 64 to display a screen file on a browser, a browser area 67, screen files 281 and 282 to be displayed on the browser, an input component 69 to control input data, a display component 70 to control display information and a monitoring applet 72 to monitor screen flow on the browser.

The client 400 attempts to connect with the server 100 by establishing a socket ( ) 41 on the TCP/IP 61 via the public network. The server 100 sends an authentication screen to obtain a user ID and a password from the client 400 and to authenticate the user. After the authentication, the server 100 provides a session ID in the first screen 281 which initially provides information and sends the screen 281 with the monitoring applet 32.

The screen 281 is transmitted to the client 400 via a route 54, developed in the browser area 67 and displayed on the browser while the monitoring applet 32 attached to the screen 281 is installed into the client 400 so as to be the monitoring applet 72 and establishes a session 53 by the daemon 22 of the server 100. After that, the monitoring applet 72 sends the screen event information to the server 100 through the session 53 until the session is released. That is, the session 53 is established between the server 100 and client 400 on the TCP/IP and information about the session 53 is managed by the daemon 22 of the server 100 and the monitoring applet 72 of the client 400. In addition, a state in which the monitoring applet 72 of the client 400 can respond to a request from the server 100 is established.

When the browser flows to a screen 282 from the screen 281 at the client 400, the monitoring applet 72 sends the screen event information indicating the screen flow to the daemon 22 of the server 100 via the session 53 while the screen 282 received through a route 55 is developed in the browser area 67 and displayed on the browser.

On the other hand, when the client 400 accesses another server 300 and the browser flows to another screen provided by the server 300, the monitoring applet 72 sends the screen event information indicating the screen flow by switching to another server to the daemon 22 of the server 100. Then, the daemon 22 initializes session information about the client 400 stored in the management table 26 so that the session is released.

A session management in a normal case will now be explained.

Figure 6:
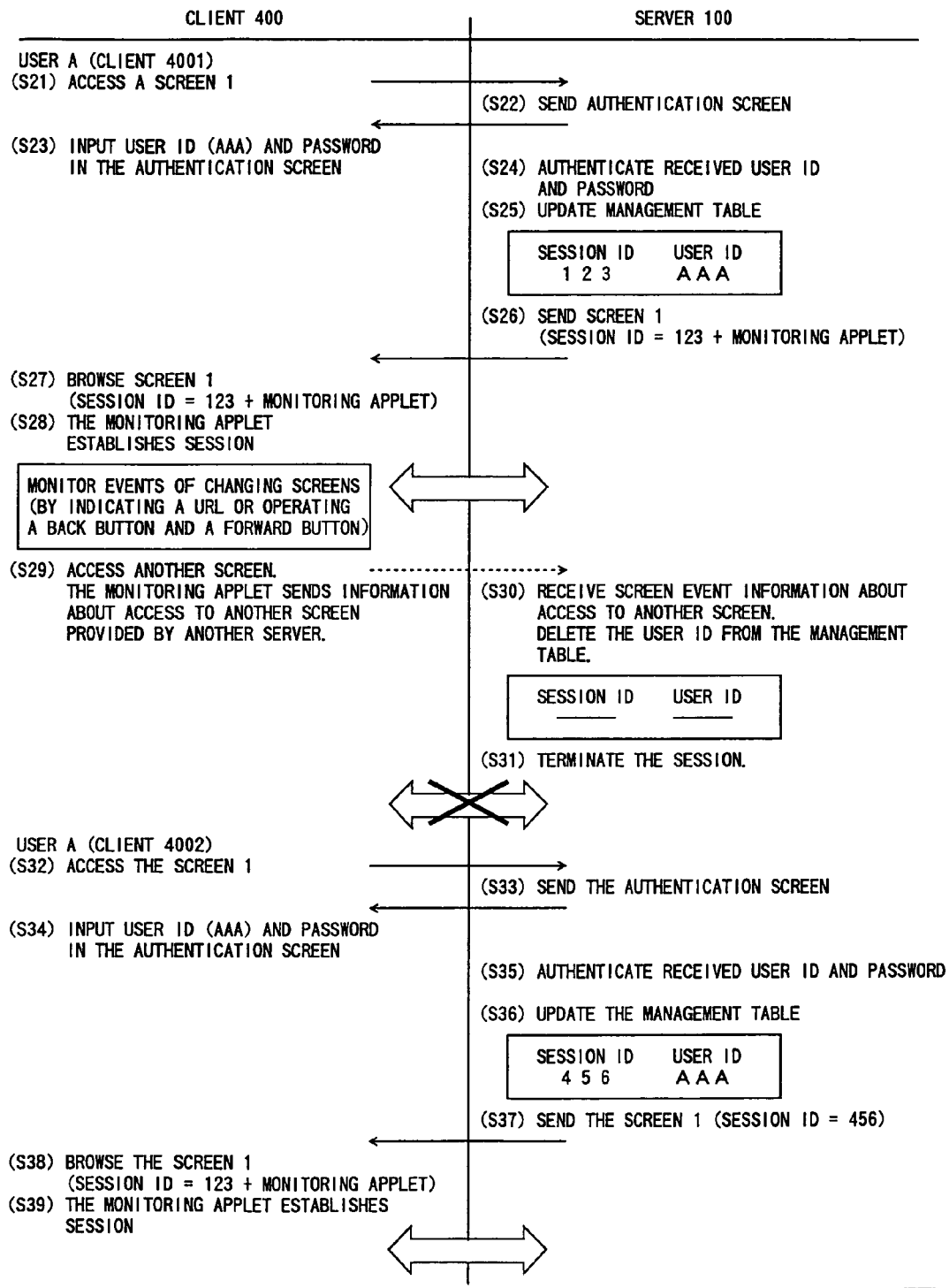
FIG. 6 is a flowchart showing the session management in a normal case.

FIG. 6 is a flowchart showing the session management in a normal case.

In FIG. 6, functional constructions of clients 4001 and 4002 are the same as that of the client 400 shown in FIG. 5.

In FIG. 6, when the client 4001 operated by a user A attempts to access the first screen 1 in order to connect to the server 100 (step S21), the server 100 sends an authentication screen to the client 400 in order to authenticate the user A (step S22). At the client 4001, the user A inputs a user ID (for example, 'AAA') and a password to the authentication screen received from the server 100 (step S23). The server 100 authenticates the user A based on the user ID and the password received form the client 4001 (step S24). The server 100 assigns a session ID (for example, '123') to the user ID 'AAA' and registers this information in the management table 26 (step S25). The server 100 provides the session ID '123' in the screen 1 and sends the screen 1 with the monitoring applet 32 to the client 4001 (step S26).

The screen 1 sent from the server 100 is displayed at the client 4001 (step S27). In addition, the monitoring applet 32 is installed into the client 4001 so as to be the monitoring applet 72. The monitoring applet 72 starts to establish a session having the session ID '123' with the server 100 (step S28).

After the session is established, the monitoring applet 72 monitors events concerning the screen flow at the client 4001, including user operations of indicating a URL, clicking a back button or a forward button and so on.

When the browser of the client 4001 flows to another screen, the monitoring applet 72 sends the screen event information indicating screen flow by switching to another server to the server 100 (step S29).

When the server 100 receives the screen event information indicating screen flow by switching to another server from the client 4001, the CGI executes the daemon 22 so that the daemon 22 deletes the user ID 'AAA' and the session ID '123' for the user A in the management table 26 (step S30). Thus, the session between the server 100 and the client 400 is released.

It is assumed that the user A attempts to obtain information from another client 4002.

The user A accesses the first screen 1 provided by the server 100 from the client 4002 (step S32). The server 100 sends the authentication screen to the client 4002 in order to authenticate the user A (step S33). The user A inputs the user ID and the password to the authentication screen displayed at the client 4002 (step S34). The server 100 authenticates the user A based on the user ID and the password received from the client 4002 (step S35) and registers the user ID 'AAA' and a new session ID '456' to the management table 26 (step S36). Subsequently, the server 100 provides the session ID '456' in the screen 1 and sends the screen 1 with the monitoring applet 32 to the client 4002 (step S37).

The client 4002 displays the screen 1 sent from the server 100 (step S38). The monitoring applet 72, which is installed into the client 4002 by the monitoring applet 32 sent with the screen 1 from the server 100, establishes a session having the session ID '456' with the server 100 (step S39).

After that, if the user ID and the password for the user A are used from other client to access the server 100, the server 100 can recognize, by using the management table 26, that the user ID for the user A is already registered with the session having the session ID '456' so that the server 100 does not authenticate the user A. Thus, the duplicate login can be prevented.

The session management method in a case in which there is no communication from a client after a session establishment, that is, the client is in a non-communication state which is not abnormal (a sleep condition) or the client is in another non-communication state caused by a fault (an abnormal condition), will now be explained.

Figure 7:
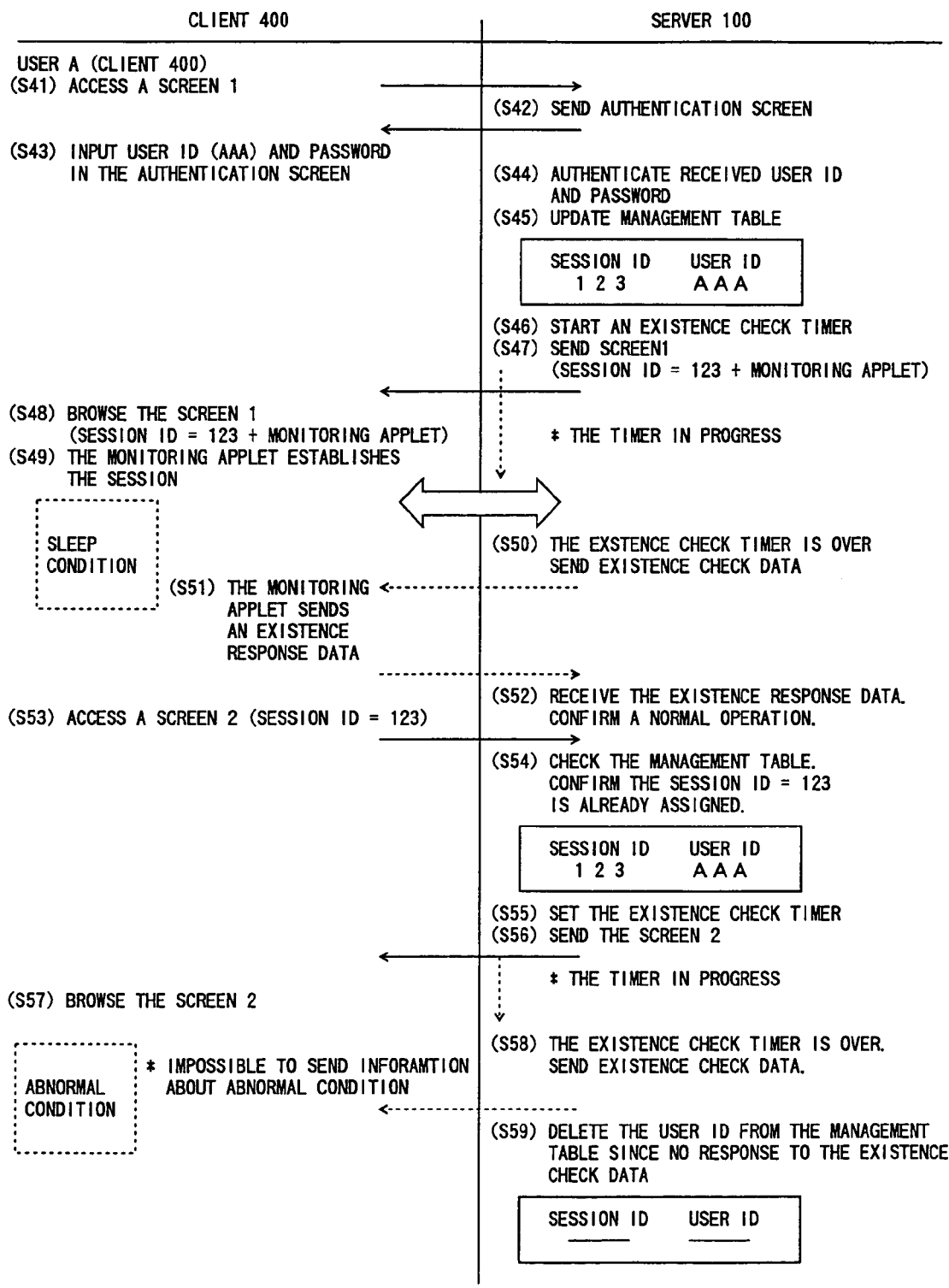
FIG. 7 is a flowchart explaining the session management method in the case in which there is no communication from a client according to the embodiment of the present invention.

FIG. 7 is a flowchart explaining the session management method in the case in which there is no communication from a client according to the embodiment of the present invention.

In FIG. 7, the user A accesses the screen 1 provided by the server 100 from the client 400 (step S41). The server 100 sends the authentication screen to the client 400 in order to authenticate the user A (step S42). The user ID (for example, 'AAA') and the password input by the user A to the authentication screen are transmitted to the client 400 (step S43).

The server 100 authenticates the user A based on the user ID 'AAA' and the password received from the client 400 (step S44) and registers the user ID 'AAA' and a session ID (for example, '123') assigned for the user ID in the management table 26 (step S45). In addition, the server 100 starts an existence check timer to check a state of the client 400 at a predetermined time (step S46). Then, the server 100 sends the screen 1, in which the session ID '123' is provided, with the monitoring applet 32 to the client 400.

The client 400 displays the screen 1 on the display unit 15 (step S48) and the monitoring applet 72 establishes a session having the session ID '123' with the server 100 (step S49).

After that, it is assumed that the client 400 is in the sleep condition.

In this case, when the existence check timer is out after the predetermined time, the server 100 sends existence check data to the client 400 (step S50). In client 400, the monitoring applet 72 sends existence response data to respond to the existence check data received from the server 100 (step S51). The server 100 confirms a normal operation of the client 400 by receiving the existence response data from the client 400 (step S52).

The client 400 accesses a screen 2 provided by the server 100, with the session ID '123' as an access key (step S53). The server 100 confirms that the user A is already registered, by searching the user ID 'AAA' stored in the management table 26 by the session ID '123' (step S54). The server 100 starts the existence check timer in order to monitor the client 400 at the predetermined time (step S55) and then the screen 2 is sent to the client 400 (step S56).

After that, it is assumed that an abnormal condition occurs to the client 400 so that the client 400 is unable to communicate with the server 100.

The server 100 sends the existence check data to the client 400 after the existence check timer passes the predetermined time (step S58). In this case, it is impossible for the client 400 to respond to the existence check data from the server 100 because the monitoring applet 72 may be destroyed. Hence, the server 100 can not receive the existence response data from the client 400. As a result, the server 100 deletes the user ID 'AAA' and the session ID '123' in the management table 26. Then, the session ID '123' is released (step S59).

In the method mentioned above, the server 100 can monitor the state of the client 400. In the case in which there is no communication with the client 400, the server 100 can check whether the client 400 is in the sleep condition or in the abnormal condition and can perform in accordance with the condition of the client 400.

A modification of the session management method in a case in which a client does not establish a session with the server 100 on the upper layer of the TCP/IP and the client sends a state of the client to the server 100 at the predetermined time on the other hand, will now be explained.

Figure 8:
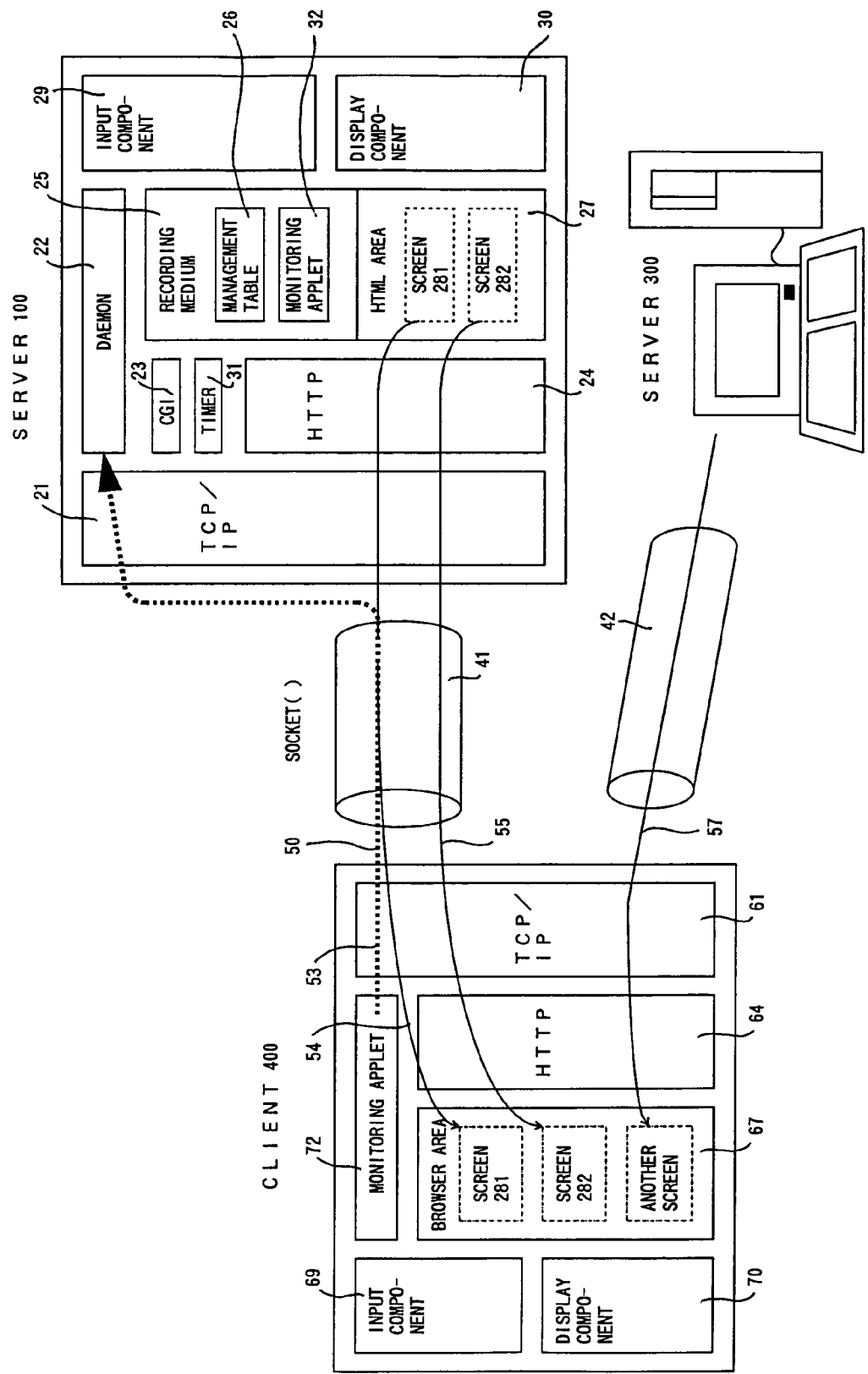
FIG. 8 is a diagram showing a session establishment between the server 100 and the client 400.

FIG. 8 is a diagram showing a session establishment between the server 100 and the client 400.

FIG. 8, parts that are the same as those shown in the previously described figures are given the same reference numbers.

The client 400 attempts to connect to the server 100 by establishing a socket ( ) 41 on the TCP/IP 61 via the public network. The server 100 sends the authentication screen to obtain a user ID and a password from the client 400 and to authenticate the user A. After the authentication, the server 100 provides a session ID in the first screen 281 which is information initially provided and sends the screen 281 with the monitoring applet 32.

The screen 281 is transmitted to the client 400 via the route 54, developed in the browser area 67 and displayed on the browser while the monitoring applet 32 attached to the screen 281 is installed into the client 400 so as to be the monitoring applet 72 and establishes a session 53 with the daemon 22 of the server 100. After that, the monitoring applet 72 sends the screen event information to the server 100 through the session 53 until the session is released.

When the browser flows to a screen 281 provided by the server 100 at the client 400, the monitoring applet 72 notifies the event of screen change to the server 100 by executing the CGI 22 of the server 100 through the session 53 while the screen 281 received from the server 100 through the route 55 is developed in the browser area 67 and displayed on the browser.

When the browser flows to another screen provided by another server 300 at the client 400, the monitoring applet 72 sends the screen event information indicating the screen flow by switching to another server to the server 100. The daemon 22 of the server 100 deletes information about the user A in the management table 26 and releases the session 53.

In addition, the server 100 uses the timer 31 to monitor the client 400 by executing the daemon 22 at the predetermined time.

The modification of the session management method in a case in which there is no communication from the client 400 will now be explained.

Figure 9:
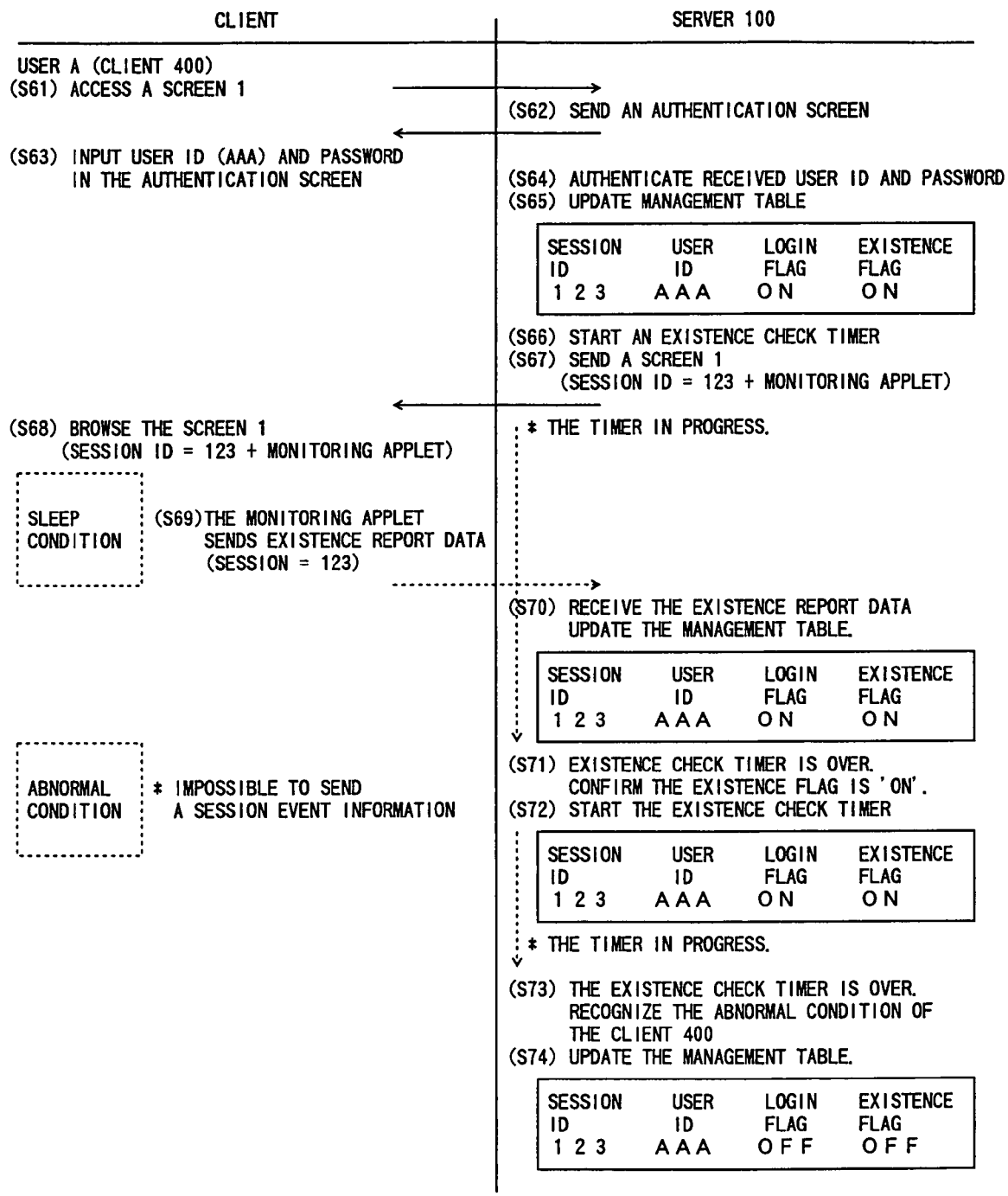
FIG. 9 is a flowchart explaining the modification of the session management method in the case in which there is no communication from a client according to the modification of the embodiment of the present invention.

FIG. 9 is a flowchart explaining the modification of the session management method in the case in which there is no communication from a client according to the modification of the embodiment of the present invention.

In FIG. 9, the user A from the client 400 accesses the screen 1 provided by the server 100 (step S61). The server 100 sends the authentication screen to the client 400 in order to authenticate the user A (step S62). The user ID (for example, 'AAA') and the password input by the user A to the authentication screen are transmitted to the client 400 (step S63).

The server 100 authenticates the user A based on the user ID 'AAA' and the password received from the client 400 (step S64). Subsequently, the server 100 registers the user ID 'AAA' with a session ID '123' assigned for the user A, and sets ON to both a login flag and an existence flag (step S65) in the management table 26. In addition, the server 100 starts the existence check timer to monitor the client 400 at the predetermined time (step S66). Moreover, the server 100 provides the session ID '123' in the screen 1 and sends the screen 1 with the monitoring applet 32 to the client 400 (step S67).

The screen 1 is displayed on the browser of the client 400 (step S68). The monitoring applet 32 is installed in the client 400 so as to be the monitoring applet 72. The monitoring applet 72 starts to send existence report data (step S69).

The CGI 23 is executed by receiving the existence report data so as to update the management table 26 (step S70). Also, the server 100 checks the existence flag in the management table 26 every time when the existence check timer passes the predetermined time (step S71). Then, the server 100 resets the existence check timer (step S72).

It is assumed that the client 400 is unable to communicate with the server 100 because the abnormal condition occurs to the client 400. When the server 100 does not receive the existence report data from the client 400 after the existence timer passes the predetermined time, the server 100 determines that the abnormal condition occurs to the client 400 (step S73). Hence, the server 100 sets OFF to both the login flag and the existence flag for the user A in the management table 26.

If the browser flows to another screen provided by another client at the client 400, the monitoring applet 72 sends the screen event information to the server 100. The server 100 sets OFF to the existence flag in the management table 26 and releases the session having the session ID '123' with client 400.

As mentioned above, while the server 100 is able to confirm the existence of the client 400 used by the user A on the established session, the server 100 does not allow the duplicate login of the user A because the management table 26 shows the existence of the client on the session. Therefore, the information providing system according to the present invention can prevent a server from duplicating authentication of the same user.

In addition, the problems in the conventional system such that the server rejects an access from the user when the client attempts to access the server after the browser at the client flows to another screen provided by another server or when a different client attempts to access the server by the same user after the abnormal condition occurs to the current client, can be eliminated by using the existence check timer at the server and the monitoring applet at the clients. Thus, it is possible for the user to be authenticated and to obtain information provided by the server in any case mentioned above.

The information providing system according to the present invention is not limited to application to servers only for the WWW associating with public networks, but can apply to a system such as an Intranet or the like that is an information system using an enterprise LAN system.

The present invention is not limited to the specifically disclosed embodiments, variations and modifications, and other variations and modifications may be made without departing from the scope of the present invention.

The present application is based on Japanese Priority Application No. 10-365589 filed on Dec. 22, 1998, the entire contents of which are hereby incorporated by reference.

What is claimed is:

1. An information providing system comprising:
a user terminal, receiving a connection state transmitting part transmitted from a server in response to a session request sent to the server to transmit a connection state information including a session identifier indicating whether the user terminal exists on a session between the user terminal and the server, which is connected to the user terminal via a network,
the server comprising:
a providing part to provide the connection state transmitting part in response to the session request received from the user terminal to the user terminal along with information to fulfill a request of the user terminal; and
a session management part to manage session information and to provide information to the user terminal according to the connection state of the user terminal received from the connection state transmitting part activated in the user terminal.

2. The information providing system as claimed in claim 1,
wherein said session management part is comprised of a first management program, and
wherein said connection state transmitting part, which is always activated in the user terminal, comprises a terminal session establishing part for establishing a session, which is used to transmit the connection state to the server, by the first management program.

3. The information providing system as claimed in claim 1,
wherein said session management part is comprised of a second management program that is activated by an execution indication from outside and comprises a connection state information management part for managing connection state information indicating a connection state of the user terminal,
wherein said connection state transmitting part activated in the user terminal comprises a connection state information providing part providing the execution indication and the connection state information indicating the connection state of the user terminal to the second management program, and
wherein said session management part manages a session, which is used to provide information to the user terminal, in accordance with the connection state information managed by the connection state information management part that is activated by the execution indication from said connection state transmitting part.

4. The information providing system as claimed in claim 1,
wherein said connection state transmitting part activated in the user terminal comprises:
an event monitoring part for monitoring an event concerning request information sent from the user terminal to another system; and
an event transmitting part for transmitting said session management part of the event concerning request information, which is sent from the user terminal to another server, when the event is detected, and
wherein said session management part releases the session when the event is transmitted from the event transmitting part of the user terminal.

5. The information providing system as claimed in claim 1,
wherein said session management part comprises a confirmation part for sending a confirmation notification in a predetermined period to check whether the user terminal is connected through the session so that said session management part manages the session in accordance with a response from—the user terminal to the confirmation notification, and
wherein said connection state transmitting part activated in the user terminal comprises a response part for sending a response notification indicating whether the user terminal is connected through the session or not, to the session management part in response to the confirmation notification sent from the session management part.

6. The information providing system as claimed in claim 3, wherein said session management part manages the session based on whether the connection state information is provided from the user terminal within a predetermined period or not.

7. A method of providing information comprising:
(a) transmitting by a user terminal to a server, via a network, a connection state including a session identifier indicating whether the user terminal exists on a session between the user terminal and the server;

(b) providing capability to perform operation (a) from the server to the user terminal along with a session identification and information to fulfill a request of the user terminal; and (c) managing session information in the server to provide information to the user terminal according to the connection state of the user terminal.

8. The method as claimed in claim 7, wherein said operation (a) activated in the user terminal comprises:

(f) monitoring an event concerning request information sent from the user terminal to another server; and (g) notifying the server of the event concerning request information sent from the user terminal to another server when the event is detected, wherein said operation (c) in the server releases the session when the event is notified from the operation (g) in the user terminal.

9. The method as claimed in claim 7, wherein said operation (c) comprises sending a confirmation notification in a predetermined period to check whether the user terminal is connected throughout a session, and wherein said operation (c) manages the session in accordance with a response from the user terminal to the confirmation notification.

10. The method as claimed in claim 7, wherein said operation (c) manages the session based on whether the connection state information is provided from the user terminal to the server within a predetermined period.

11. The information providing apparatus of claim 1, further comprising:

a session establishing part for establishing a session between the information providing system and the user terminal when the user is authenticated in accordance with authentication information from the user terminal and the session information managed by the session management part.

12. The method of claim 7, further comprising:

establishing a session between the information providing system and the user terminal when the user is authenticated in accordance with authentication information from the user terminal and the session information managed by the session management part.

13. A method of managing user authentication in a server, comprising:

receiving a user ID and a password from a user and authenticating the user;

storing a session ID that corresponds to the user ID in a management table;

transmitting the session ID and a monitoring applet to the authenticated user's client;

receiving screen event information indicating whether the user's client exists on a session specified by the session ID, from the monitoring applet in the user's client; and releasing the session ID when determined that the user's client is no longer accessing the server according to the screen event information received from the monitoring applet in the user's client.

14. The method of claim 13, further comprising determining that the user's client is no longer accessing the server when the screen event information indicates that the user's client has requested a screen from another server.

15. The method of claim 13, further comprising:

starting an existence check timer when a screen is sent to the user's client;

transmitting an existence check data to the user's client when the existence check timer expires before any screen event information is received from the monitoring applet in the user's client;

determining that the user's client is still accessing the server when an existence response data is received from the user's client in response to the existence check data; and determining that the user's client is no longer accessing the server when no existence response data is received from the user's client in response to the existence check data.

16. The method of claim 13, further comprising:

starting an existence check timer when a screen is sent to the user's client;

determining that the user's client is still accessing the server when an existence report data is received from the user's client before the existence check timer expires; and determining that the user's client is no longer accessing the server when no existence report data is received from the user's client before the existence check timer expires.

17. A machine-readable medium that provides instructions for managing user authentication in a server, which, when executed by a machine, cause the machine to perform operations comprising:

receiving a user ID and a password from a user and authenticating the user;

storing a session ID that corresponds to the user ID in a management table;

transmitting the session ID and a monitoring applet to the authenticated user's client;

receiving screen event information indicating whether the user's client exists on a session specified by the session ID, from the monitoring applet in the user's client; and releasing the session ID when determined that the user's client is no longer accessing the server according to the screen event information received from the monitoring applet in the user's client.

18. The machine-readable medium of claim 17, wherein the instructions cause the machine to perform operations further comprising determining that the user's client is no longer accessing the server when the screen event information indicates that the user's client has requested a screen from another server.

19. The machine-readable medium of claim 17, wherein the instructions cause the machine to perform operations further comprising:

starting an existence check timer when a screen is sent to the user's client;

transmitting an existence check data to the user's client when the existence check timer expires before any screen event information is received from the monitoring applet in the user's client;

determining that the user's client is still accessing the server when an existence response data is received from the user's client in response to the existence check data; and determining that the user's client is no longer accessing the server when no existence response data is received from the user's client in response to the existence check data.

20. The machine-readable medium of claim 17, wherein the instructions cause the machine to perform operations further comprising:

starting an existence check timer when a screen is sent to the user's client;

determining that the user's client is still accessing the server when an existence report data is received from the user's client before the existence check timer expires; and determining that the user's client is no longer accessing the server when no existence report data is received from the user's client before the existence check timer expires.

* * * * *

UNITED STATES PATENT AND TRADEMARK OFFICE
CERTIFICATE OF CORRECTION

PATENT NO. : 6,959,392 B1 Page 1 of 1
APPLICATION NO. : 09/465761
DATED : October 25, 2005
INVENTOR(S) : Kenichi Yamamoto et al.

It is certified that error appears in the above-identified patent and that said Letters Patent is hereby corrected as shown below:

Column 9, line 53, after "transmit" delete "a"

Signed and Sealed this

Seventh Day of November, 2006

JON W. DUDAS
*Director of the United States Patent and Trademark Office*